US011214045B2

(12) United States Patent
Delprat

(10) Patent No.: US 11,214,045 B2
(45) Date of Patent: Jan. 4, 2022

(54) MULTI-LAYER COEXTRUSION METHOD

(75) Inventor: Patrick Delprat, Lescar (FR)

(73) Assignee: TRINSEO EUROPE GMBH, Horgen (CH)

( * ) Notice: Subject to any disclaimer, the term of this patent is extended or adjusted under 35 U.S.C. 154(b) by 974 days.

(21) Appl. No.: 12/301,515

(22) PCT Filed: May 23, 2007

(86) PCT No.: PCT/FR2007/051318
§ 371 (c)(1),
(2), (4) Date: Sep. 18, 2009

(87) PCT Pub. No.: WO2007/135344
PCT Pub. Date: Nov. 29, 2007

(65) Prior Publication Data
US 2010/0040876 A1  Feb. 18, 2010

(30) Foreign Application Priority Data
May 23, 2006  (FR) ........................ 0604594

(51) Int. Cl.
B32B 27/30 (2006.01)
B32B 27/08 (2006.01)
B32B 27/18 (2006.01)
C08L 33/06 (2006.01)

(52) U.S. Cl.
CPC ............ B32B 27/30 (2013.01); B32B 27/08 (2013.01); B32B 27/18 (2013.01); B32B 27/302 (2013.01); B32B 27/304 (2013.01); B32B 27/308 (2013.01); B32B 2250/24 (2013.01); B32B 2250/40 (2013.01); B32B 2307/558 (2013.01); B32B 2307/584 (2013.01); B32B 2419/00 (2013.01); B32B 2509/00 (2013.01); B32B 2605/00 (2013.01); C08L 33/064 (2013.01); Y10T 428/269 (2015.01)

(58) Field of Classification Search
CPC ... B32B 27/308; B32B 27/08; B32B 2250/02; B32B 27/285; B32B 27/286; B32B 27/304; B32B 27/365; B32B 27/32; B32B 27/302; B32B 27/36; B32B 2307/558; B32B 2307/584; B32B 27/30; B32B 2264/025; B32B 2264/0214; C08L 33/12; C08L 13/00; C08L 13/02; C08L 2205/22; C08L 33/02; C08L 2205/02; C08L 133/12; C08F 220/06; C08F 220/14; C08F 220/18; C08J 7/0427; C08J 7/046; C09D 7/65; C09D 7/68; C09D 133/064; C09D 133/12
USPC ..................................................... 526/318.4
See application file for complete search history.

(56) References Cited

U.S. PATENT DOCUMENTS

| 3,502,604 | A | * | 3/1970 | Seiji ...................... C08F 265/04 524/501 |
| 3,637,545 | A | * | 1/1972 | Fivel ....................... C08F 20/12 525/285 |
| 3,740,367 | A | * | 6/1973 | Winkelblech .............. C08J 3/05 524/108 |
| 3,793,402 | A | * | 2/1974 | Owens ..................... C08L 33/20 525/81 |
| 4,576,870 | A | * | 3/1986 | Liebler et al. ................. 428/515 |
| 4,657,796 | A | * | 4/1987 | Musil .................. B32B 17/1077 428/38 |
| 5,061,558 | A | * | 10/1991 | Fischer .................... B32B 27/18 264/176.1 |
| 5,063,112 | A | * | 11/1991 | Gross ....................... C08J 7/047 264/176.1 |
| 5,258,230 | A | * | 11/1993 | LaFleur .................. B32B 27/08 428/2 |
| 5,318,737 | A |   | 6/1994 | Trabert et al. |
| 5,637,408 | A | * | 6/1997 | Oenbrink et al. ......... 428/474.7 |
| 5,700,566 | A | * | 12/1997 | Muller .................... B32B 27/08 428/332 |
| 6,147,162 | A | * | 11/2000 | Tadokoro .......... B29C 45/14778 525/222 |
| 6,555,245 | B2 | * | 4/2003 | Tajima .................. C08F 285/00 428/520 |

(Continued)

FOREIGN PATENT DOCUMENTS

EP     0476942         3/1992
EP     1070742 A1 *   1/2001  ............. C08L 33/12
(Continued)

OTHER PUBLICATIONS

"Glass Transition Temperature", Polymer Properties Database, www.polymerdatabase.com, printed from the internet on Jun. 7, 2016.*
(Continued)

Primary Examiner — Monique R Jackson
(74) Attorney, Agent, or Firm — RatnerPrestia

(57) ABSTRACT

Method used to protect a thermoplastic polymer consisting of superposing a protective layer (I) comprising an acrylic copolymer comprising, by weight (the total making 100%): from 80 to 99.8% of methyl methacrylate (MMA), from 0 to 20% of at least one comonomer that can be copolymerized with MMA by a radicalar method, and from 0.2 to 10% of maleic anhydride or 15% of acrylic and/or methacrylic acid and possibly anhydride groups with a formula:

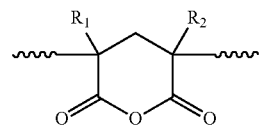

in which $R_1$ and $R_2$ denote H or a methyl radical, a layer of at least one thermoplastic polymer (II), all these steps being performed in order by coextrusion, by hot compression or by multi-injection.

5 Claims, No Drawings

(56) References Cited

U.S. PATENT DOCUMENTS

| | | | |
|---|---|---|---|
| 6,696,513 B1 | 2/2004 | Welton et al. | |
| 6,852,405 B2 | 2/2005 | Wanat et al. | |
| 7,294,399 B2 | 11/2007 | Wanat et al. | |
| 7,507,464 B2* | 3/2009 | Walrath | B32B 27/08 428/203 |
| 7,915,346 B2* | 3/2011 | Banyay | B32B 21/04 525/199 |
| 8,206,782 B2* | 6/2012 | Numrich et al. | 427/207.1 |
| 2003/0003297 A1* | 1/2003 | Tadokoro | B05D 7/02 428/343 |
| 2004/0102578 A1* | 5/2004 | Nishimura | B32B 27/28 525/222 |
| 2004/0126551 A1* | 7/2004 | Van Rheenen | 428/220 |
| 2005/0064155 A1 | 3/2005 | Masuda et al. | |
| 2005/0148716 A1* | 7/2005 | Sakamoto | C08F 265/04 524/394 |
| 2005/0233124 A1* | 10/2005 | Marot et al. | 428/216 |
| 2006/0008642 A1* | 1/2006 | Marot et al. | 428/334 |
| 2006/0240266 A1* | 10/2006 | Schicht | C03C 17/3435 428/426 |
| 2009/0130401 A1* | 5/2009 | Paruchuri | B60R 13/0243 428/195.1 |

FOREIGN PATENT DOCUMENTS

| | | | |
|---|---|---|---|
| GB | WO 00/08098 | 2/2000 | |
| JP | 62220508 | 8/1987 | |
| JP | 10279766 A * | 10/1998 | |
| JP | 2003105158 A * | 4/2003 | |
| JP | 2003211525 | 7/2003 | |
| JP | 2005314534 | 11/2005 | |
| WO | WO-0021751 A1 * | 4/2000 | B32B 27/30 |

OTHER PUBLICATIONS

"Thermal Transitions of Homopolymers: Glass Transition & Melting Point", Reference: Polymer Properties, Sigma-Aldrich, www.sigmaaldrich.com, pp. 52-53, printed from the internet on Jun. 7, 2016.*

Machine translation of JP2003015158A, published Apr. 2003. (Year: 2003).*

Product brochure for ALTUGLAS (RTM) Ht 121, Hot Technology for Luminous Designs, ALTUGLAS by ARKEMA, retrieved from https://www.altuglas.com on Mar. 19, 2019. (Year: 2019).*

Okubo, Effect of hydrophilicity of polymer particles on their glass transition temperatures in the emulsion state, 2004, Colloid Polym Sci, vol. 282, pp. 1150-1154. (Year: 2004).*

Rufino, Infrared study on methyl methacrylate-methacrylic acid copolymers and their sodium salts, 2003, Polymer, vol. 44, pp. 7189-7198. (Year: 2003).*

Chen, Effect of methacrylic acid:methyl methacrylate monomer ratios on polymerization rates and properties of polymethyl methacrylates, 1997, Journal of Biomedical Materials Research, vol. 36, pp. 190-199. (Year: 1997).*

Machine translation of EP1070742A1, published Jan. 2001. (Year: 2001).*

ALTUGLAS (RTM) HT 121, Product information sheet, ALTUGLAS by ARKEMA, Jun. 2005. (Year: 2005).*

Press Release, Apr. 2014, ALTUGLAS International ARKEMA Group, Arkema's Altuglas International business achieves new levels of heat resistance with Plexiglas® HT121 acrylic resin. (Year: 2014).*

* cited by examiner

MULTI-LAYER COEXTRUSION METHOD

This application claims benefit, under U.S.C. § 119 or § 365 of PCT application PCT/FR2007/051318 filed May 23, 2007; and French application number FR 0604594 filed May 23, 2006.

FIELD OF THE INVENTION

The present invention relates to a method for protecting a thermoplastic polymer by means of an acrylic polymer. The invention also relates to a multilayer structure comprising the thermoplastic polymer and the acrylic polymer and to the uses of this multilayer structure.

BACKGROUND OF THE INVENTION

Certain thermoplastic polymers such as high-impact polystyrene (HIPS), ABS (acrylonitrile-butadiene-styrene) resins, and PVC are widely used in the manufacture of articles and moldings that are encountered frequently in everyday life (panels of caravans and of mobile homes, extruded sections for windows, doors or shutters, etc.). Although these polymers display a reasonable level of mechanical strength and are relatively inexpensive, they have poor resistance to ageing (in the broadest sense, i.e. resistance to light, to scratching, to solvents and chemicals, etc.). That is why it is now common practice to cover these plastics with a protective layer (surface layer) made of an acrylic polymer.

The Applicant has found that certain acrylic polymers improve the scratch resistance of the protective layer. In addition, when the protective layer must be impact-resistant, it is common practice to add an impact modifier to the acrylic polymer, but this impact modifier has the effect of reducing the scratch resistance. In the presence of the selected acrylic polymers, the Applicant has found that it is possible to improve the impact strength while maintaining good scratch resistance.

U.S. Pat. No. 5,318,737 and EP 0458520 A2 describe a process for coextruding a thermoplastic polymer with an acrylic resin ("capstock" process), which resin is composed of MMA and a $C_1$-$C_4$ alkyl acrylate, such as ethyl acrylate.

EP 1174465 B1 describes a "capstock" process for which the acrylic resin used for the surface layer comprises 10 to 95% of a PMMA, 0 to 60% of an impact modifier and 5 to 40% of an acrylic additive. The PMMA may be a copolymer of MMA with a $C_1$-$C_{10}$ alkyl acrylate.

EP 1109861 B1 describes a "capstock" process for which the acrylic resin used for the surface layer comprises 50 to 99% of MMA and 1 to 50% of an alkyl acrylate, such as methyl, ethyl or butyl acrylate.

EP 1013713 A1 describes a "capstock" process for which the acrylic resin used for the surface layer is based on an ester or amide of acrylic or α-alkylacrylic acid.

EP 0476942 A2 describes a "capstock" process for which the resin used for the surface layer is a blend of an acrylic resin and PVDF. The acrylic resin may be an MMA/alkyl acrylate copolymer.

EP 1350812 A2 describes a "capstock" process for which the resin used for the surface layer is a copolymer of MMA and a C1-C4 alkyl acrylate.

None of these documents describes the process of the invention.

SUMMARY OF THE INVENTION

The invention relates to a method for protecting a thermoplastic polymer comprising superposing, in this order, by coextrusion, by hot compression molding or by multi-injection molding:

a protective layer (I) comprising an acrylic copolymer comprising, by weight (the total making 100%):
from 80 to 99.8% of methyl methacrylate (MMA),
from 0 to 20% of at least one comonomer radically copolymerizable with MMA, and
from 0.2 to 10%:
of maleic anhydride
or anhydride groups of formula:
of acrylic and/or methacrylic acid and of

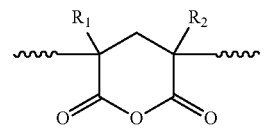

in which $R_1$ and $R_2$ denote H or a methyl radical,
a layer of at least one thermoplastic polymer (II).

The invention also relates to a multilayer structure comprising the protective layer (I) and the layer of thermoplastic polymer (II) and to the use of the multilayer structure for the manufacture of objects and everyday articles such as:
bodies or casings of lawnmowers, of chain saws, of jet-skis, of domestic appliances;
automobile trunk lids, bodywork parts;
automobile number plates;
external wall panels of caravans and of mobile homes;
external panels of refrigerators;
panels of shower cubicles;
doors of buildings;
window moldings;
cladding panels;
doors of household equipment (for example kitchen doors).

The invention will be better understood on reading the detailed description given below.

DETAILED DESCRIPTION OF THE INVENTION

Definitions $T_g$ denotes the glass transition temperature of a polymer. By extension, the $T_g$ of the homopolymer obtained by radical polymerization of a monomer will be designated by $T_g$ of said monomer. For simplicity, the term (meth)acrylate denotes an acrylate or a methacrylate.

(Meth)acrylic monomer means a monomer which can be:
an acrylic monomer such as the alkyl acrylates, preferably $C_1$-$C_{10}$, of cycloalkyl or of aryl such as methyl, ethyl, propyl, n-butyl, isobutyl, tert-butyl, 2-ethylhexyl acrylate, the hydroxyalkyl acrylates such as 2-hydroxyethyl acrylate, the etheralkyl acrylates such as 2-methoxyethyl acrylate, the alkoxy- or aryloxypolyalkylene glycol acrylates such as the methoxypolyethylene glycol or ethoxypolyethylene glycol acrylates, the aminoalkyl acrylates such as 2-(dimethylamino)ethyl acrylate, the silylated acrylates, glycidyl acrylate,
a methacrylic monomer such as the alkyl methacrylates, preferably $C_2$-$C_{10}$, of cycloalkyl or of aryl such as ethyl, propyl, n-butyl, isobutyl, tert-butyl, 2-ethylhexyl methacrylate, the hydroxyalkyl methacrylates such as 2-hydroxyethyl methacrylate, the etheralkyl methacrylates such as 2-methoxyethyl methacrylate, the alkoxy- or aryloxypolyalkylene glycol methacrylates such as methoxypolyethylene glycol or ethoxy-polyethylene glycol methacrylates, the aminoalkyl methacrylates such as 2-(dimethylamino)ethyl methacrylate, the silylated methacrylates, glycidyl methacrylate.

Regarding the protective layer (I), it comprises an acrylic copolymer comprising by weight:
from 80 to 99.8% of methyl methacrylate (MMA),
from 0 to 20%, and preferably from 0 to 10%, of at least one comonomer radically copolymerizable with MMA,
from 0.2 to 10% of acrylic and/or methacrylic acid,
the total making 100%.

Preferably, the acrylic copolymer comprises by weight:
from 80 to 99% of methyl methacrylate (MMA),
from 0 to 10% of at least one comonomer radically copolymerizable with MMA,
from 1 to 10% of acrylic and/or methacrylic acid,
the total making 100%.

Preferably, the copolymerizable comonomer is a (meth)acrylic monomer or a vinylaromatic monomer such as, for example, styrene, substituted styrenes, alpha-methylstyrene, monochlorostyrene, tert-butylstyrene.

Even more preferably, the acrylic copolymer comprises by weight:
from 90 to 99% of methyl methacrylate (MMA),
from 1 to 10% of acrylic and/or methacrylic acid,
the total making 100%.

Two adjacent acid units can interact by dehydration to give an anhydride group of formula:

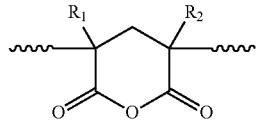

in which $R_1$ and $R_2$ denote H or a methyl radical. The dehydration may take place when hot, during extrusion of the copolymer. The copolymer therefore contains acrylic and/or methacrylic acid and optionally the above anhydride groups (derived from acrylic and/or methacrylic acid units by intramolecular dehydration).

According to one variant, the acrylic copolymer comprises maleic anhydride in place of acrylic and/or methacrylic acid.

The acrylic copolymer can be obtained by means of radical polymerization carried out by a bulk method, in solution in a solvent or alternatively in a dispersed medium (suspension or emulsion). When the method of polymerization in aqueous suspension is used, the acrylic polymer is recovered in the form of beads that are approximately spherical. A proportion of the water is removed, then the polymer is extruded in the form of granules using a degassing extruder.

The impact strength of the acrylic copolymer can be improved by means of at least one impact modifier. An extruder is advantageously used to produce the mixture. The impact modifier can be, for example, an acrylic elastomer. The acrylic elastomer can be a block copolymer having at least one elastomeric block. For example, it can be a styrene-butadiene-methyl methacrylate copolymer or a methyl methacrylate-butyl acrylate-methyl methacrylate copolymer. The impact modifier can also be in the form of fine multilayer particles (core-shell particles), having at least one elastomeric (or soft) layer, i.e. a layer formed from a polymer having a $T_g$ below $-5°$ C. and at least one rigid (or hard) layer, i.e. formed from a polymer having a $T_g$ above $25°$ C.

Preferably, the polymer with $T_g$ below $-5°$ C. is obtained from a mixture of monomers comprising from 50 to 100 parts of at least one $C_1$-$C_{10}$ alkyl (meth)acrylate, from 0 to 50 parts of a copolymerizable monounsaturated comonomer, from 0 to 5 parts of a copolymerizable crosslinking monomer and from 0 to 5 parts of a copolymerizable grafting monomer.

Preferably, the polymer with $T_g$ above $25°$ C. is obtained from a mixture of monomers comprising from 70 to 100 parts of at least one $C_1$-$C_4$ alkyl (meth)acrylate, from 0 to 30 parts of a copolymerizable monounsaturated monomer, from 0 to 5 parts of a copolymerizable crosslinking monomer and from 0 to 5 parts of a copolymerizable grafting monomer.

The $C_1$-$C_{10}$ alkyl (meth)acrylate is preferably butyl acrylate, 2-ethylhexyl acrylate, or octyl acrylate. The $C_1$-$C_4$ alkyl (meth)acrylate is preferably methyl methacrylate. The copolymerizable monounsaturated monomer can be a $C_1$-$C_{10}$ alkyl (meth)acrylate, styrene, alpha-methylstyrene, butylstyrene, acrylonitrile. It is preferably styrene or ethyl acrylate. The grafting monomer can be allyl (meth)acrylate, diallyl maleate, crotyl (meth)acrylate. The crosslinking monomer can be diethylene glycol dimethacrylate, 1,3-butylene glycol dimethacrylate, 1,4-butylene glycol dimethacrylate, divinyl benzene, trimethylolpropane triacrylate (TMPTA).

The multilayer particles can be of various morphologies. For example, it is possible to use particles of the following types:
"soft-hard" having an elastomeric core (inner layer) and a rigid shell (outer layer) as described for example in European Application EP 1061100 A1;
"hard-soft-hard" having a rigid core, an elastomeric intermediate layer and a rigid shell, as described for example in Applications U.S. Pat. No. 3,793,402 or US 2004/0030046 A1;
"soft-hard-soft-hard" having in this order: an elastomeric core, a rigid intermediate layer, another elastomeric intermediate layer and a rigid shell, as described for example in French Application FR-A-2446296, which describes examples of such particles.

The size of the particles is generally less than 1 μm and is advantageously between 50 and 300 nm. The multilayer particles are prepared by polymerization in aqueous emulsion, in several stages. During the 1st stage, the nuclei are formed, around which the layers will be produced. The final size of the particles is determined by the number of nuclei that are formed in the 1st stage. During each of the subsequent stages, by polymerizing the appropriate mixture, a new layer is formed successively around the nuclei or particles from the preceding stage. In each stage, polymerization is carried out in the presence of a radical initiator, a surfactant and optionally a transfer agent. For example, the sodium, potassium or ammonium persulfate is used. Once formed, the particles are recovered by coagulation or by spraying. An anticlumping agent can be added to prevent the particles agglomerating.

The proportion of impact modifier in the acrylic copolymer varies from 0 to 60 parts, advantageously from 1 to 60 parts, preferably from 5 to 40 parts, even more preferably from 10 to 30 parts, per 100 parts of acrylic copolymer.

Additives

The protective layer or layers can optionally comprise one or more additives selected from:
thermal stabilizers;
lubricants;
fireproofing agents;
UV stabilizers;
antioxidants;

antistatics;

dulling agents, which can be mineral fillers, for example talc, calcium carbonate, titanium dioxide, zinc oxide or magnesium oxide, or organic fillers such as crosslinked beads based on styrene and/or MMA (examples of such beads are given in EP 1174465);

pigments and/or dyes.

The proportion of additive(s) varies from 0 to 10 parts, advantageously from 0.2 to 10 parts, preferably from 0.5 to 5 parts, of additive(s) to 100 parts of acrylic polymer.

A list of UV stabilizers that can be used will be found in the document "Plastics Additives and Modifiers Handbook, chap. 16, Environmental Protective Agents", J. Edenbaum, Ed., Van Nostrand, pages 208-271, which is incorporated in the present application by reference. Preferably, the UV stabilizer is a compound from the class of HALS, triazines, benzotriazoles or benzophenones. Combinations of several UV stabilizers can be used for obtaining better UV resistance. As examples of UV stabilizers that can be used, we may mention TINUVIN® 770, TINUVIN® 328, TINUVIN® P or TINUVIN® 234.

Regarding the thermoplastic polymer, this can be selected from the following list of polymers:

saturated polyester (PET, PBT, etc.);
ABS;
SAN (styrene-acrylonitrile copolymer);
ASA (acrylic-styrene-acrylonitrile copolymer);
polystyrene (crystalline or high-impact);
polypropylene (PP);
polyethylene (PE);
polycarbonate (PC);
PPO;
polysulfone;
PVC;
chlorinated PVC (PVCC);
expanded PVC.

It can also comprise blends of two or more polymers from the above list. For example, it can be a PPO/PS or PC/ABS blend.

Method

The invention relates to a method for protecting a thermoplastic polymer comprising superposing, in the order stated, by coextrusion, by hot compression molding or by multi-injection molding:

a protective layer (I) comprising the acrylic copolymer as defined above, a layer of at least one thermoplastic polymer (II).

According to one variant, another protective layer comprising the acrylic copolymer is superposed against the layer of thermoplastic polymer (from the side opposite the 1st layer of the acrylic copolymer), that is to say that the layer of thermoplastic polymer (II) is located between two layers (Ia) and (Ib) each comprising an acrylic copolymer or else that the layer of thermoplastic polymer (II) is sandwiched between the protective layer (I) and the other protective layer. Superposition is therefore carried out in this order by coextrusion, by hot compression molding or by multi-injection molding:

a protective layer (Ia) comprising an acrylic copolymer as defined above, a layer of at least one thermoplastic polymer (II), a protective layer (Ib) comprising an acrylic copolymer as defined above.

Hot compression molding of the layers is one technique that can be used. A technique of co-injection or multi-injection molding can also be used. The technique of multi-injection molding comprises injecting the melts constituting each of the layers in one and the same mold. According to a 1st multi-injection molding technique, the melts are injected into the mold simultaneously. According to a 2nd technique, a movable insert is placed in the mold. Using this insert, a melt is injected into the mold, then the movable insert is removed and a second melt is injected.

The preferred technique is coextrusion, which is based on using as many extruders as there are layers to be extruded (for more details, see the work *Principles of Polymer Processing* of Z. Tadmor, published by Wiley, 1979). The layers of molten polymers are combined at the exit of the extruders to form the multilayer structure. This technique is more flexible than those mentioned above and permits multilayer structures to be obtained even for complicated geometries, for example profiles. It also provides excellent mechanical uniformity. The technique of coextrusion is a known technique in thermoplastics processing (see for example Précis de matières plastiques, Structures-propriétés [Review of plastics, Structures-Properties], 1989, mise en œuvre et normalisation [application and standardization] 4th edition, Nathan, p. 126). Document U.S. Pat. No. 5,318,737 describes an example of coextrusion with a thermoplastic polymer. Reference may also be made to the documents U.S. Pat. Nos. 3,476,627, 3,557,265 or 3,918,865.

Multilayer Structure

The multilayer structure comprises, in this order:

a protective layer (I) comprising an acrylic copolymer as defined previously, a layer of at least one thermoplastic polymer (II), the layers being arranged on one another.

According to one variant, the multilayer structure comprises in this order:

a protective layer (Ia) comprising an acrylic copolymer as defined above, a layer of at least one thermoplastic polymer (II), a protective layer (Ib) comprising an acrylic copolymer as defined above.

The layers are coextruded, produced by hot compression or multi-injection molding, and are preferably coextruded.

Preferably, the protective layer has a thickness between 10 and 1000 µm, preferably between 50 and 200 µm.

Applications

The multilayer structure, notably that obtained by one of the methods described above, can be used in the manufacture of objects and of everyday articles. These may be, for example:

bodies or casings of lawnmowers, of chain saws, of jet-skis, of domestic appliances, etc.;
automobile trunk lids,
bodywork parts;
automobile number plates;
external wall panels of caravans and of mobile homes;
external panels of refrigerators;
panels of shower cubicles;
doors of buildings;
window moldings;
cladding panels;
doors of household equipment (for example kitchen doors)

PVC is used advantageously as thermoplastic polymer in the manufacture of articles that are intended for exterior applications such as doors of buildings, gutters, window moldings or cladding panels. ABS is used advantageously as thermoplastic polymer in the manufacture of bodies or casings, notably of domestic electrical appliances, automobile number plates, external panels of refrigerators or bodywork parts.

Preferably, in the case of PVC, the multilayer structure is a cladding panel. Preferably, in the case of ABS, the multilayer structure is a bodywork part.

EXAMPLES

The following examples illustrate the invention according to the best mode envisaged by the inventors. They are given solely by way of illustration and do not limit the scope of the invention.

Two-layer structures were obtained by a compression-molding process then evaluated using a standardized Erichsen scratch resistance test. Only the nature of the protective layer (I) changed between these various structures.

Compositions of the Various Structures:

For the structure 1 (by way of comparison) the protective layer was ALTUGLAS® MI7T. ALTUGLAS® MI7T is an acrylic copolymer containing from 20 to 30% of "hard-soft-hard" impact modifiers as defined in U.S. Pat. No. 3,793,402.

For the structure 2 (according to the invention) the protective layer was ALTUGLAS® HT 121. The ALTUGLAS® HT 121 product is an acrylic copolymer which comprises 3 to 7% of methacrylic acid or anhydride functional groups per 97 to 93% of MMA.

For the structure 3 (according to the invention) the protective layer was PLEXIGLAS® FT15. PLEXIGLAS® FT15 is a product sold by Roehm.

For the structure 4 (according to the invention) the protective layer was composed of a blend, blend 1, containing 92.5% of ALTUGLAS® HT 121+7.5% of a "hard-soft-hard" impact modifier as described in U.S. Pat. No. 3,793,402.

For the structure 5 (according to the invention) the protective layer was composed of a blend, blend 2, containing 89.0% of ALTUGLAS® HT 121+11% of a "hard-soft-hard" impact modifier as described in U.S. Pat. No. 3,793,402.

For the structure 6 (according to the invention) the protective layer was composed of a blend, blend 3, containing 76.5% of ALTUGLAS® HT 121+23.5% of a "hard-soft-hard" impact modifier as described in U.S. Pat. No. 3,793,402.

Preparation of the Protective Layer (I):
Conditions for obtaining the blends 1, 2 and 3 containing a blend of PMMA and impact modifiers using a Buss extruder:
Temperature profile: GC1 and GC2: 215° C.; GC3: 210° C.;
Die: 220° C.
Conditions for obtaining extruded films constituting the protective layer (I):
Temperature profile of the extruder (° C.):
Temperature of the substance at the inlet and at the centre: 220° C.;
Temperature of the substance on exiting the die: 225° C.;
Extrusion speed: 5.5 m/min;
Screw speed: 39 rpm;
Cooling temperature: 80° C.; and
Thickness: 100 μm.
Conditions for Obtaining Two-Layer ABS (II)/Protective Layer (I) Structures by Compression in a Hot Press.
Operating Parameters:
Frames: 3.1 mm;
Temperature: 180° C.;
Preheat: 3 minutes;
Hold: 3 minutes at 100 bar; and
Thickness: 3.2 mm.
Characteristics of the Structures:
The scratch resistance of the various structures was evaluated using the standardized Erichsen scratch resistance test. A rapid bending test was also carried out for these various structures, (cf. table 1).
For the Scratch Resistance:
Test conditions derived from the Erichsen method inspired by the NFT 51113 standard:
Tungsten carbide tip;
Number of revolutions: 1;
Speed of revolution: 10.5 mm/s;
Observations: optical microscope;
Mode: 10× reflection in polarized light;
2N load used;
Value measured: notch width in microns.
For the Rapid Bending Test:
The toughness (Re), expressed in kJ/m$^2$, was measured on ABS test specimens which were or were not protected by an acrylic protective layer. The toughness was measured using a rapid bending test. The test specimen was subjected to bending in the middle of the span at a constant rate. During the test, the load applied to the test specimen was measured. The bending test was carried out at a constant rate on the MTS-831 servo-hydraulic device. The force was measured using a piezo-electric cell embedded in the nose of the striker on a range of 569.4 N. The displacement of the test specimen during the stress was measured by an LVDT sensor on the hydraulic jack with a range of 50 mm.

During the test, the force (expressed in N) and the displacement (in mm) of the striker were recorded. From the experimental curves, the area under the curve, which represents the force as a function of the displacement up to failure of the specimen or up to the limit of displacement before slip (evaluated at 20 mm), was calculated. This area, expressed in joules, is representative of the energy supplied to the system during loading. The bending strength, denoted by Re, is the energy at break relative to the central cross section of the bar, expressed in kJ/m$^2$.

TABLE 1

| Structure | Erichsen* scratch resistance (μm) | Re (kJ/m$^2$) |
|---|---|---|
| ABS alone (comp.) | 160 | |
| 1 (comp): ABS/MI7T | 99 | 33.2 ± 1.6 |
| 2 (inv): ABS/HT 121 | 83 | 14.0 ± 1.7 |
| 3 (inv): ABS/FT15 | 88 | 13.8 ± 1.5 |
| 4 (inv.): ABS/92.5% HT121 + 7.5% IM | 91 | 19.6 ± 0.9 |
| 5 (inv): ABS/89% HT 121 + 11% IM | 95 | 27.5 ± 1.6 |
| 6 (inv): ABS/76.5% HT 121 + 23.5% IM | 100 | 35.1 ± 1.3 |

ABS: MAGNUM 3904 from Dow; melt flow index: 1.5 g/10 min at 230° C./3.8 kg, thickness 3 mm
IM: Impact modifiers It is thus observed that the structures according to the invention have good scratch resistance. Furthermore, the addition of impact modifiers to the acrylic copolymer makes it possible to improve the impact strength while retaining a good scratch resistance.

The invention claimed is:

1. A multilayer structure consisting of, in this order:
a) a protective layer (I) which is a single layer consisting of:
1) an acrylic copolymer consisting of, by weight:
from 93 to 97% by weight of methyl methacrylate (MMA) monomer units, from 3 to 7% by weight of methacrylic acid monomer units
the MMA monomer units and the methacrylic acid monomer units totaling to 100% by weight,
2) between 0 and less than or equal to 11 parts of core-shell impact modifier, per 100 parts of said acrylic copolymer 1), wherein said impact modifier is an impact modifier having a hard-soft-hard core morphology, having a particle size in the range of 50 to 300 nm; and 3) optionally up to 5 parts of one or more additives selected from the group consisting of thermal stabilizers, lubricants, fireproofing agents, UV stabilizers, antioxidants, dulling agents and dyes, to 100 parts of acrylic copolymer a), and b) a layer of at least one thermoplastic polymer (II) selected from the group consisting of a saturated polyester, polyethylene terephthalate (PET), polybutylene phthalate (PBT), acrylonitrile/butadiene/styrene (ABS); styrene-acrylonitrile copolymer (SAN), crystalline polystyrene, high impact polystyrene, polypropylene (PP), polyethylene (PE), polycarbonate (PC), polyphenylene oxide (PPO), polysulfone, polyvinyl chloride (PVC), chlorinated PVC (PVCC), expanded PVC and blends thereof, the layers being arranged directly adjacent to, and in contact with, one another, wherein said protective layer (I) has an Erichsen scratch resistance value of from 83 to 95 micrometers as measured using a standardized Erichsen scratch resistance test with the following conditions based on the NFT 51113 standard:
tungsten carbide tip;
number of revolutions: 1;
speed of revolution: 10.5 mm/s;
observations: optical microscope;
mode: 10× reflection in polarized light;
2N load used;
value measured: notch width in microns.

2. The multilayer structure as claimed in claim 1 wherein said multilayer structure is an article selected from the group consisting of
bodies or casings of lawnmowers, of chain saws, of jet-skis, of domestic appliances;
automobile trunk lids, bodywork parts;
automobile number plates;
external wall panels of caravans and of mobile homes; external panels of refrigerators;
panels of shower cubicles; doors of buildings; window moldings; cladding panels; and
doors of household equipment.

3. The multilayer structure as claimed in claim 1, wherein the protective layer (I) consists of from 1 to less than or equal to 11 parts of core-shell impact modifier, per 100 parts of said acrylic copolymer.

4. The multilayer structure as claimed in claim 1, wherein the protective layer (I) consists of from 0 to less than or equal to 7.5 parts of core-shell impact modifier, per 100 parts of said acrylic copolymer.

5. The multilayer structure as claimed in claim 1, wherein the protective layer (I) consists of from 1 to less than or equal to 7.5 parts of core-shell impact modifier, per 100 parts of said acrylic copolymer.

* * * * *